United States Patent
Geiger et al.

(10) Patent No.: US 10,942,269 B2
(45) Date of Patent: Mar. 9, 2021

(54) METHOD FOR MONITORING A SURROUNDING AREA OF A VEHICLE-TRAILER COMBINATION, MONITORING DEVICE, DRIVER ASSISTANCE SYSTEM AND VEHICLE-TRAILER COMBINATION

(71) Applicant: VALEO Schalter und Sensoren GmbH, Bietigheim-Bissingen (DE)

(72) Inventors: Tobias Geiger, Bietigheim-Bissingen (DE); Gerald Koudijs, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 199 days.

(21) Appl. No.: 16/102,982

(22) Filed: Aug. 14, 2018

(65) Prior Publication Data
US 2019/0056492 A1 Feb. 21, 2019

(30) Foreign Application Priority Data
Aug. 15, 2017 (DE) .................. 10 2017 118 588

(51) Int. Cl.
*G01S 13/931* (2020.01)
*G01S 13/87* (2006.01)

(52) U.S. Cl.
CPC ............ *G01S 13/931* (2013.01); *G01S 13/87* (2013.01); *G01S 2013/9315* (2020.01); *G01S 2013/9316* (2020.01); *G01S 2013/93272* (2020.01)

(58) Field of Classification Search
CPC .......... G01S 13/931; G01S 2013/9315; G01S 2013/9316; G01S 2013/93272; G01S 13/87

USPC ............................................................ 342/70
See application file for complete search history.

(56) References Cited

U.S. PATENT DOCUMENTS

| | | | | |
|---|---|---|---|---|
| 6,894,608 B1 * | 5/2005 | Gunderson | ............ | B60Q 1/525 340/468 |
| 9,211,889 B1 * | 12/2015 | Hoetzer | ................ | G01S 15/931 |
| 9,910,151 B2 * | 3/2018 | Cashler | ..................... | G01S 7/40 |

(Continued)

FOREIGN PATENT DOCUMENTS

| | | | | |
|---|---|---|---|---|
| DE | 102008029612 A1 * | 1/2009 | ........... | G01S 13/862 |
| DE | 102013217430 A1 * | 3/2014 | ........... | B60W 30/10 |

(Continued)

OTHER PUBLICATIONS

German Search Report in corresponding German Application No. 10 2017 118 588.7, dated May 30, 2018 (7 pages).

*Primary Examiner* — Bernarr E Gregory
*Assistant Examiner* — Nuzhat Pervin
(74) *Attorney, Agent, or Firm* — Osha Bergman Watanabe & Burton LLP

(57) ABSTRACT

The invention concerns a method for monitoring a surrounding area (6) of a vehicle-trailer combination (1) formed by a motor vehicle (2) and a trailer (3), with which at least one radar sensor (7) is disposed on a rear area (8) at the trailer (3) for acquiring radar sensor data from the surrounding area (6) behind the trailer (3) and the acquired radar sensor data are transmitted to a controller (10) of the motor vehicle (2). Moreover, the invention concerns a monitoring device (5), a driver assistance system and a vehicle-trailer combination (1).

14 Claims, 4 Drawing Sheets

(56) References Cited

U.S. PATENT DOCUMENTS

| | | | | |
|---|---|---|---|---|
| 2003/0025596 | A1* | 2/2003 | Lang | B60R 1/00 340/435 |
| 2005/0168331 | A1* | 8/2005 | Gunderson | G01S 15/931 340/468 |
| 2008/0238636 | A1* | 10/2008 | Birging | B60R 25/33 340/426.1 |
| 2009/0005932 | A1* | 1/2009 | Lee | G01S 13/931 701/41 |
| 2009/0125182 | A1* | 5/2009 | Hoetzer | B60T 8/248 701/36 |
| 2011/0125457 | A1* | 5/2011 | Lee | G01S 13/867 702/151 |
| 2013/0162461 | A1* | 6/2013 | Lucking | G01S 15/931 342/70 |
| 2014/0176716 | A1* | 6/2014 | Wallat | B60W 30/12 348/148 |
| 2017/0050627 | A1* | 2/2017 | Lee | B60T 8/17558 |
| 2017/0334355 | A1* | 11/2017 | Hubbell | G01S 13/931 |

FOREIGN PATENT DOCUMENTS

| | | | | |
|---|---|---|---|---|
| DE | 102012018012 A1 | 5/2014 | | |
| DE | 10035124 B4 | 3/2016 | | |
| DE | 102014220586 A1 | 4/2016 | | |
| DE | 102016008030 A1 | 2/2017 | | |
| DE | 102015224364 A1 * | 6/2017 | | G08G 1/167 |
| WO | WO-2014174028 A1 * | 10/2014 | | B60D 1/36 |
| WO | WO-2016015938 A1 * | 2/2016 | | B60W 30/08 |

\* cited by examiner

METHOD FOR MONITORING A SURROUNDING AREA OF A VEHICLE-TRAILER COMBINATION, MONITORING DEVICE, DRIVER ASSISTANCE SYSTEM AND VEHICLE-TRAILER COMBINATION

The invention concerns a method for monitoring a surrounding area of a vehicle-trailer combination formed by a motor vehicle and a trailer. Moreover, the invention concerns a monitoring device, a driver assistance system and a vehicle-trailer combination.

It is already known from the prior art to assist a driver of a vehicle-trailer combination formed by a motor vehicle and a trailer when manoeuvring the vehicle-trailer combination. Because the surrounding area behind the motor vehicle is usually blocked by the trailer and the surrounding area behind the trailer therefore cannot be seen or can hardly be seen by the driver, it is already known to dispose cameras on a rear area of the trailer and to record the surrounding area behind the trailer captured by the cameras in images. The images can be shown to the driver on a display device of the motor vehicle. This is described in DE 10 2014 220 586 A1, for example.

A distance warning system for a motor vehicle and a distance detection system for a trailer coupled to the motor vehicle are known from DE 10 2016 008 030 A1. In this case, the distance detection system of the trailer is connected to the distance warning system of the motor vehicle via a data line for transmitting information. In this case, the distance detection system of the trailer is embodied without a control unit. DE 100 35 124 B4 discloses an electronic distance warning system for a towing vehicle and a trailer. In this case, the distance warning system comprises means for transmitting signal waves that comprise distance sensors disposed on the towing vehicle for sending/receiving transmission signals. Moreover, the means for transmitting the signal waves also comprise distance sensors disposed on the trailer of the towing vehicle.

It is the object of the present invention to provide a solution to how a surrounding area of a vehicle-trailer combination can be monitored particularly inexpensively, simply and reliably. This object is achieved according to the invention by a method, a monitoring device, a driver assistance system and a vehicle-trailer combination with the features according to the respective independent claims. Advantageous embodiments of the invention are the subject matter of the dependent claims, the description and the figures.

With one aspect of a method according to the invention for monitoring a surrounding area of a vehicle-trailer combination formed by a motor vehicle and a trailer, at least one radar sensor is disposed in particular on a rear area of the trailer for acquiring radar sensor data from the surrounding area behind the trailer. The acquired radar sensor data are transmitted in particular to a controller of the motor vehicle.

With a particularly preferred embodiment of a method according to the invention for monitoring a surrounding area of a vehicle-trailer combination formed by a motor vehicle and a trailer, at least one radar sensor is disposed on a rear area of the trailer for acquiring radar sensor data from the surrounding area behind the trailer and the acquired radar sensor data are transmitted to a controller of the motor vehicle.

The invention also includes a monitoring device for a trailer of a vehicle-trailer combination formed by a motor vehicle and the trailer, which is designed to monitor a surrounding area of the vehicle-trailer combination. According to one embodiment of the monitoring device, it comprises in particular at least one radar sensor that can be mounted on a rear area of the trailer for acquiring radar sensor data from the surrounding area behind the trailer and that in particular is designed to transmit the acquired radar sensor data to a controller of the motor vehicle. According to a particularly preferred embodiment of the monitoring device, it comprises at least one radar sensor that can be mounted on a rear area of the trailer for acquiring radar sensor data from the surrounding area behind the trailer and that is designed to transmit the acquired radar sensor data to a controller of the motor vehicle.

By means of the method, a driver of a vehicle-trailer combination formed by the motor vehicle and the trailer can be assisted when manoeuvring the vehicle-trailer combination. In particular, the driver can be assisted when reversing the vehicle-trailer combination. The trailer can for example be a caravan, a horse trailer, a tandem trailer or a single-axle trailer. The trailer can be attached or coupled by means of a tow bar to a trailer coupling of the motor vehicle and is thereby pivotable relative to the motor vehicle. In the coupled state of the trailer, a region behind the trailer is not usually visible to the driver or is only viable with difficulty, because the view to the rear for the driver is blocked by the trailer. In particular, when reversing or when swinging out with the vehicle-trailer combination, owing to the restricted view it can occur that objects or obstacles behind the trailer are overlooked and there is thus a risk of a collision with the objects. Therefore, the surrounding area behind the trailer is monitored with the at least one radar sensor, so that the objects can be detected. In this case, the objects can be stationary objects or obstacles or dynamic objects, for example pedestrians or other vehicles approaching the vehicle-trailer combination from behind.

For detecting objects behind and at an angle behind the trailer, the radar sensor is disposed or mounted on the rear area of the trailer, so that a direction of view or a detection region of the radar sensor starting from the rear area of the trailer is directed to the rear or in the rearward direction. In this case, the radar sensor can be permanently attached or fixed to the trailer or only temporarily attached to the trailer. The radar sensor can transmit radar signals in the form of electromagnetic waves into the surrounding area and receive back the radar signals reflected at an object in the surrounding area. From the radar signals, information can be extracted about the object, for example an angle or a direction to the object, a distance to or a separation from the object and a relative movement between the radar sensor or the trailer and the object. The radar signals can be analysed by an internal controller of the radar sensor regarding the object information, so that the object information can be transmitted to the controller of the motor vehicle as the radar sensor data. The radar signals can also be transmitted to the controller of the motor vehicle as the radar sensor data without having been analysed by the radar sensor, and the controller of the motor vehicle thereupon carries out the analysis of the radar signals.

Radar sensors have the advantage that they can operate regardless of a view. This means that ambient conditions, for example darkness, snow, fog, rain, etc. hardly affect the measurements of the radar sensor. Moreover, radar sensors have long range. By means of radar sensors disposed on the trailer of a vehicle-trailer combination, the surrounding area behind the trailer can also be monitored particularly reliably.

The radar sensor data are preferably transmitted to the controller of the motor vehicle wirelessly. In particular, the radar sensor and the controller can communicate bidirectionally via the wireless communications link. Via the bidirectional wireless link, control signals can thus also be transmitted from the controller of the motor vehicle to the at least one radar sensor. The at least one radar sensor can thus be controlled remotely. For example, the radar sensor data of the radar sensor can be transmitted to the controller by means of short-range communications and/or WLAN. For communicating, the remotely-controlled radar sensor and the controller can comprise respective transmitters for sending and receiving signals. Wireless transmission of the radar sensor data gives the advantage that the trailer can be particularly simply retrofitted with the monitoring device. Thus, the use of the monitoring device is also possible with trailers that were not supplied with the radar sensor and/or that comprise no data lines for communications with the motor vehicle, for example owing to the year of manufacture, by establishing the wireless link between the radar sensor and the controller of the motor vehicle and simply transmitting the radar sensor data wirelessly from the radar sensor to the controller of the motor vehicle.

Particularly preferably, the at least one radar sensor is embodied as a portable radar sensor that can be mounted on the rear area of the trailer so as to be removable without damage. The radar sensor is thus a mobile radar sensor, which for example can be disposed only temporarily on the trailer by the driver of the vehicle-trailer combination. The radar sensor can thus be mounted arbitrarily on the trailer for temporary disposition and can be removed again. For example, for mounting the radar sensor for removal without damage, a receptacle for the at least one radar sensor can be permanently mounted on the rear area of the trailer. A receptacle of this type can for example comprise a holder that can be latched to a latching element of the radar sensor. Thus, the radar sensor can for example be particularly simply disposed or fixed on the trailer by means of a latching connection. When the radar sensor is required for a different trailer, for example, the connection between the trailer and the radar sensor can be released again, so that the radar sensor can be removed without damage so as to be disposed on another trailer. Thus, a single radar sensor can be used for a number of trailers. Said embodiment is particularly advantageous and inexpensive for drivers that own a plurality of trailers for the motor vehicle, for example.

It has proved to be advantageous if the at least one radar sensor is automatically calibrated after mounting the at least one radar sensor on the trailer. The calibration can be carried out by the controller of the motor vehicle, for example. In the case of a portable radar sensor, the same can be calibrated once the radar sensor is disposed on the trailer, particular, owing to the temporary arrangement of the radar sensor, it can occur that the radar sensor has a different mounting position on the trailer for each arrangement. Owing to the variable mounting position, for example the direction of view of the radar sensor can change. The knowledge of the mounting position is however important in order to be able to correctly determine the positions of acquired objects in the surrounding area of the vehicle-trailer combination relative to the vehicle-trailer combination. Owing to the calibration, which in particular is carried out for each new mounting of the radar sensor on the trailer, in particular the actual mounting position of the at least one radar sensor on the trailer can be determined. Owing to the calibration, it can be advantageously ensured that objects in the surrounding area can be particularly accurately localized and thus the surrounding area of the vehicle-trailer combination can be particularly reliably monitored.

In this case, it can be provided that for calibrating the at least one radar sensor, sensor data of at least one sensor device of the motor vehicle and radar sensor data of the at least one radar sensor are received, a first environment map describing the surrounding area of the vehicle-trailer combination is determined based on the sensor data of the at least one sensor device of the motor vehicle, a second environment map describing the surrounding area of the vehicle-trailer combination is determined based on the radar sensor data of the at least one radar sensor and a tolerance range is determined for a mounting position of the at least one radar sensor on the trailer using a comparison of the environment maps. The calibration or self-calibration of the at least one radar sensor is carried out here by means of a so-called SLAM algorithm (SLAM "Simultaneous Localization and Mapping"), with which the environment maps are produced simultaneously and the postures of the at least one sensor device and the at least one radar sensor within the respective environment maps are estimated. The environment maps describe the surrounding area of the vehicle-trailer combination in an object-based manner.

For determining the first environment map, using the sensor data of the at least one sensor device of the motor vehicle, first detection points that correspond to certain objects in the surrounding area are detected in the surrounding area. Moreover, spatial positions of the first detection points are recorded. For determining the second environment map, using the radar sensor data of the at least one radar sensor of the trailer, second detection points are detected in the surrounding area that also correspond to objects in the surrounding area. Moreover, spatial positions of the second detection points are recorded. The spatial positions of the first and second detection points can be transposed into a common coordinate system, for example by representing the first and second detection points in a common environment map. The mutually corresponding first and second detection points are then identified. The mutually corresponding first and second detection points are in particular those detection points that correspond to or relate to the same objects in the surrounding area. Using the comparison of the first and second detection points, in particular using a comparison of the spatial positions of the first and second detection points, the tolerance range for the mounting position of the radar sensor on the trailer can be determined. The tolerance range describes the possible positions at which the radar sensor is disposed at the point in time of recording the radar sensor data. The number of possible mounting positions of the at least one radar sensor can thus be limited based on the environment maps.

In a development of the invention, for determining an actual mounting position of the at least one radar sensor on the trailer, at least one parameter of the trailer is determined, wherein the at least one parameter of the trailer is determined depending on at least one predetermined stationary parameter of the motor vehicle and/or at least one acquired dynamic parameter of the motor vehicle and/or at least one acquired dynamic parameter of the trailer. For example, the actual mounting position of the at least one radar sensor on the trailer can be determined depending on the tolerance range, which has been determined using the environment maps, and depending on the at least one parameter of the trailer. Using the environment maps, the possible mounting positions can indeed be determined approximately, but the actual mounting position is in particular dependent on a current position of the trailer relative to the motor vehicle and a geometry of the trailer. In this case, the at least one parameter of the trailer describes the current position of the trailer relative to the motor vehicle and the geometry of the trailer.

In particular, an attachment angle of the trailer and/or a distance between a trailer coupling on the motor vehicle and an axle of the trailer is determined as the at least one parameter of the trailer. In this case, the attachment angle is a pivot angle between a longitudinal axis of the motor vehicle and a longitudinal axis of the trailer. The magnitude of the attachment angle is in particular 0° if the trailer is not pivoted out, for example if the vehicle-trailer combination is travelling straight ahead and the longitudinal axis of the trailer is oriented along the longitudinal axis of the motor vehicle. When the trailer is swung out, for example during a turn by the vehicle-trailer combination, the attachment angle differs from 0° and the longitudinal axis of the trailer is oriented at an angle to the longitudinal axis of the motor vehicle. The attachment angle is thus dependent on a direction of travel of the vehicle-trailer combination and describes the current position of the trader relative to the motor vehicle. Moreover, the mounting position is dependent on the distance between the trailer coupling the motor vehicle and the axle of the trailer, which describes the geometry of the trailer. Said distance is made up of the length of a tow bar of the trailer and the distance between the front of the trailer facing the rear area of the motor vehicle and the axle of the trailer.

A wheelbase of the motor vehicle and/or a distance between a rear axle and a trailer coupling of the motor vehicle is preferably specified as the at least one stationary parameter of the motor vehicle. In particular, a wheel steering angle of front wheels and/or a wheel steering angle of rear wheels of the motor vehicle is detected as the at least one dynamic parameter of the motor vehicle and an attachment angle of the trailer is detected as the at least one dynamic parameter of the trailer. The attachment angle can for example be detected by means of a sensor device in the trailer coupling. The wheel steering angle can be detected by means of a sensor device of the motor vehicle. Using the wheel steering angle, a current direction of travel of the vehicle-trailer combination can be determined. The stationary parameters of the motor vehicle are in particular invariant geometric parameters of the motor vehicle that also influence the driving dynamics of the motor vehicle. The measured attachment angle of the trailer, the wheel steering angle and the geometric parameters of the motor vehicle can now be used to determine the distance between the trailer coupling and the trailer axle as the at least one parameter of the trailer. In particular, the attachment angle is also corrected, so that in particular the corrected attachment angle is determined as the at least one parameter of the motor vehicle. Moreover, using the measured attachment angle of the trailer, using the wheel steering angle and using the geometric parameters of the motor vehicle, a parameter of the radar sensor, in particular a sensor offset, can be determined, which is dependent on the radar sensor used.

The at least one parameter of the trailer is preferably determined depending on the at least one predetermined stationary parameter of the motor vehicle and/or the at least one acquired dynamic parameter of the motor vehicle and/or the at least one acquired dynamic parameter of the trailer by means of a Kalman filter. The geometry of the motor vehicle, the wheel steering angle of the motor vehicle and the measured attachment angle of the trailer are used as input variables for the Kalman filter, in particular an unscented Kalman filter (UKF). Based on said input variables, the Kalman filter can estimate the corrected attachment angle, the distance between the trailer coupling and the axle of the trailer and the sensor offset of the radar sensor.

In a development of the invention, the area occupied by the trailer in the surrounding area is identified using the at least one parameter of the trailer, wherein using the area occupied by the trailer, measurement points in the sensor data of a sensor device in the vehicle are classified as being related to the trailer or to the surrounding area, in the case of a trailer coupled to the motor vehicle, it can occur that the trailer lies in the detection regions of the sensor devices in the vehicle. However, the trailer is not an obstacle for the motor vehicle. Therefore, the measurement points originating from reflections of the sensor signals of the sensor device in the vehicle on the exterior of the trailer for example, should be filtered out of the sensor data. If the region of the surrounding area that is covered or occupied by the trailer is known, for example in the first environment map, which was produced based on the sensor data of the sensor device in the vehicle, the measurement points of the trailer are identified and for example filtered out. Thus, it can be prevented that the driver is unnecessarily warned about the trailer, which is actually not an obstacle.

In a further embodiment of the invention, a first environment map describing the surrounding area is determined based on sensor data of at least one sensor device of the motor vehicle, a second environment map describing the surrounding area is determined based on the radar sensor data of the at least one radar sensor and the first and the second environment maps are merged or combined to form a common environment map. The objects acquired by the sensor device in the vehicle and the objects acquired by the at least one radar sensor on the trailer side are placed in the common environment map, wherein objects that have been acquired by the sensor device in the vehicle and by the at least one radar sensor on the trailer side are combined.

Moreover, the invention concerns a driver assistance system for a vehicle-trailer combination with a monitoring device according to the invention and a controller for receiving the radar sensor data. The driver assistance system can assist the driver of the vehicle-trailer combination when manoeuvring the vehicle-trailer combination. For example, the driver can be assisted when reversing and/or during overtaking manoeuvres with the vehicle-trailer combination. For this purpose, based on the objects in the surrounding area acquired using the radar sensor of the trailer, the vehicle-trailer combination can be manoeuvred by the controller of the motor vehicle at least semi-autonomously and/or warning signals for the driver of the vehicle-trailer combination for avoiding a collision of the vehicle-trailer combination with the objects can be generated.

A vehicle-trailer combination according to the invention comprises a motor vehicle, a trailer and a driver assistance system according to the invention, wherein the at least one radar sensor of the monitoring device is mounted on the trailer. The motor vehicle is embodied in particular as a passenger vehicle.

The preferred embodiments presented with reference to the method according to the invention and the advantages thereof apply correspondingly to the monitoring device according to the invention, to the driver assistance system according to the invention and to the vehicle-trailer combination according to the invention.

Further features of the invention arise from the claims, the figures and the description of the figures. The features and combinations of features mentioned above in the description and the features and combinations of features mentioned below in the description of the figures and/or shown in the figures alone are not only able to be used in the respectively specified combination, but also in other combinations or on their own, without departing from the scope of the invention. Thus, embodiments of the invention are also to be considered as included and disclosed that are not explicitly shown and described in the figures, but that can emerge from and can be produced by separate combinations of features from the described embodiments. Embodiments and combinations of features are also to be considered as being disclosed that thus do not comprise all the features of an originally formulated independent claim. Moreover, embodiments and combinations of features, in particular as a result of the embodiments presented above, are to be considered as disclosed that go beyond or differ from the combinations of features described in the references back to the claims.

The invention is now described in detail using preferred exemplary embodiments and with reference to the accompanying drawings.

In the drawings.

In the figures, identical and functionally identical elements are provided with the same reference characters.

Figure 1:
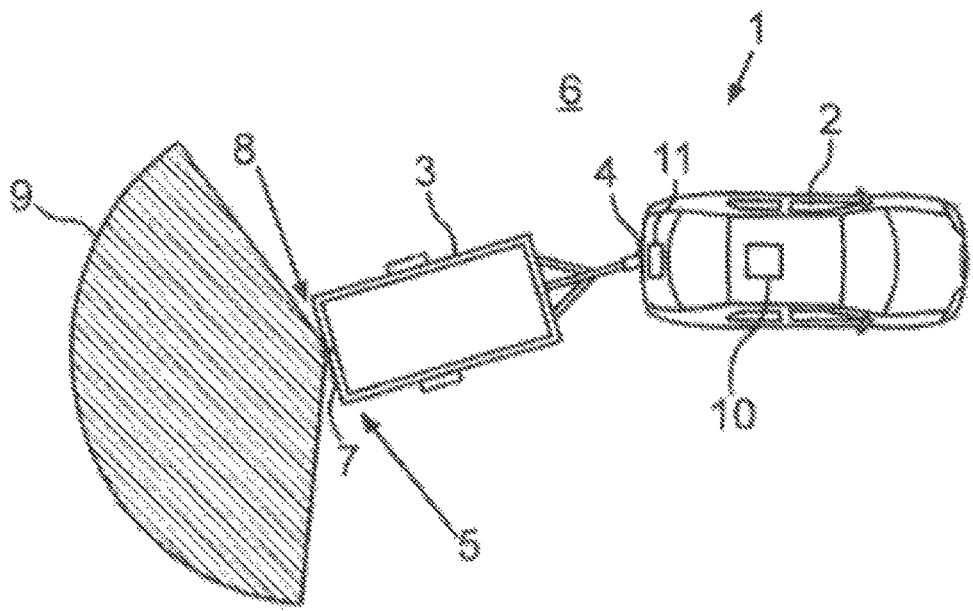
FIG. 1 shows a schematic representation of an embodiment of a vehicle-trailer combination according to the invention.

FIG. 1 shows a vehicle-trailer combination 1 according to an embodiment of the present invention. The vehicle-trailer combination 1 comprises a motor vehicle 2, which in the present case is embodied as a passenger vehicle. Moreover, the vehicle-trailer combination 1 comprises a trailer 3 that is coupled to the motor vehicle 2 by means of a trailer coupling 4 of the motor vehicle 2 and that is pivotable relative to the motor vehicle 2. The vehicle-trailer combination 1 comprises a monitoring device 5 that is designed to monitor a surrounding area 6 of the vehicle-trailer combination 1. The monitoring device 5 comprises at least one radar sensor 7 that is disposed on a rear area 8 of the trailer 3 and that acquires radar sensor data from the surrounding area 6 behind the trailer 3. For this purpose, a detection region 9 of the radar sensor 7 is arranged in the surrounding area 6 behind the trailer 3. The radar sensor 7 is moreover designed to transmit the acquired radar sensor data to a controller 10 of the motor vehicle 2, in particular, for this purpose the radar sensor 7 and the controller 10 are connected to each other via a wireless link. Moreover, the controller 10 can control the radar sensor 7 remotely using the wireless link. Moreover, the motor vehicle 2 can comprise at least one sensor device 11 that can acquire sensor data from the surrounding area 6 of the vehicle-trailer combination 1.

Figure 2:
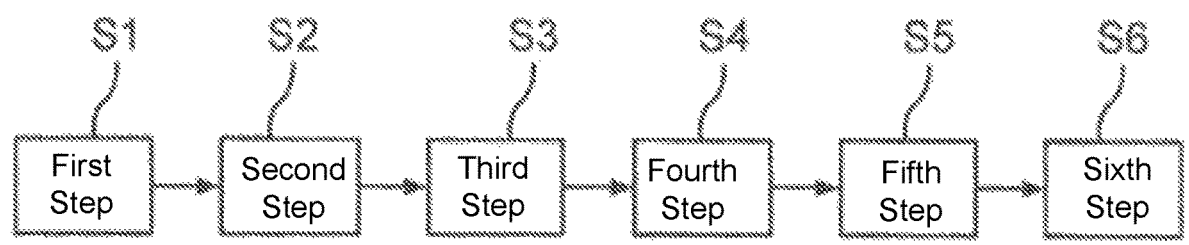
FIG. 2 shows a flow chart of an embodiment of a method according to the invention.
Figure 3:
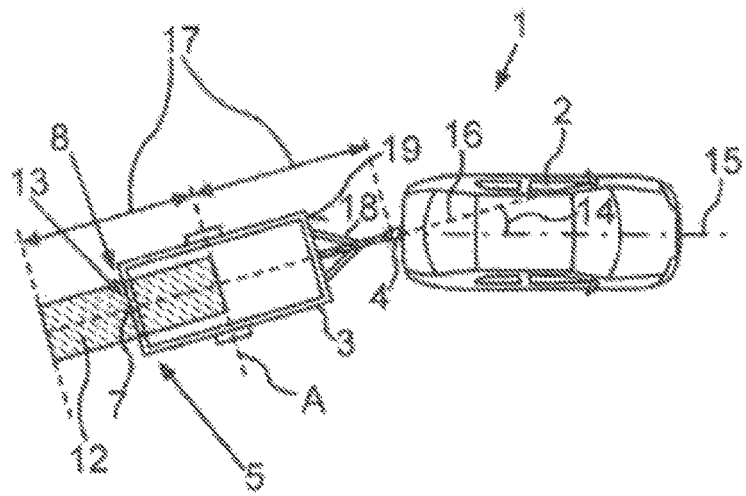
FIG. 3 shows a schematic representation of the vehicle-trailer combination with stationary and dynamic parameters of the vehicle-trailer combination.

The radar sensor 7 can be embodied here as a portable, mobile radar sensor 7 that can be arbitrarily mounted on the trailer 3 and removed again by a driver of the vehicle-trailer combination 1. In the case in which the radar sensor 7 is embodied as a portable radar sensor 7, a method can be carried out that is represented schematically in FIG. 2. In this case, in a first step S1 the radar sensor 7 is mounted on the rear area 8 of the trailer 3. In a second step S2, the radar sensor 7 can be calibrated by determining a tolerance range 12 for a possible mounting position 13 of the radar sensor 7 as shown in FIG. 3. For determining the tolerance range 12, for example using the sensor data of the sensor device 11 of the motor vehicle 2, a first environment map can be determined that describes the surrounding area 6 in an object-based manner. Using the radar sensor data of the radar sensor 7, a second environment map can be determined that describes the surrounding area 6 of the trailer 3 in an object-based manner. Using a comparison of the two environment maps, the tolerance range 12 can then be determined, which includes the actual mounting position 13 of the radar sensor 7.

Because the actual mounting position 13 is dependent on a position and a geometry of the trailer 3, in a third step S3 at least one parameter of the trailer 3 can be determined. In particular, an attachment angle 14 is determined as an angle between a longitudinal axis 15 of the motor vehicle 2 and a longitudinal axis 16 of the trailer 3 and a distance 17 between the trailer coupling 4 of the motor vehicle 2 and an axle A of the trailer 3 is determined as the at least one parameter of the trailer 3. The distance 17 is composed in particular of the length of a tow bar 18 of the trailer 3 and a distance between the front 19 of the trailer 3 and the axle A of the trailer 3.

Figure 4:
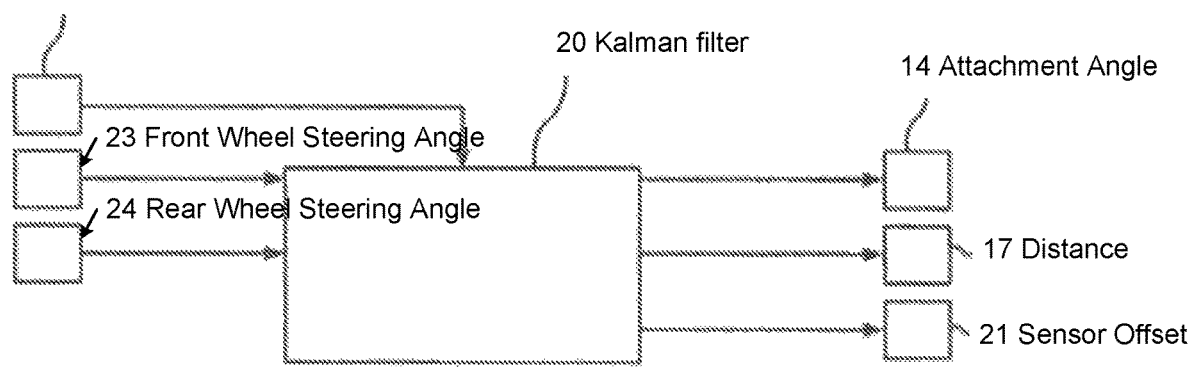
FIG. 4 shows a schematic representation of a Kalman filter for determining parameters of the trailer.

The attachment angle 14 and the distance 17 can for example be determined by means of a Kalman filter 20, in particular a, unscented Kalman filter 20, which is shown in FIG. 4. By means of the Kalman filter 20, moreover, a sensor offset 21 can be determined that is dependent on the type of radar sensor 7 used. In this case inputs of the Kalman filter 20 are stationary parameters 22 of the motor vehicle 2, in particular geometric parameters of the motor vehicle 2. Such geometric parameters of the motor vehicle 2 are in particular a wheelbase of the motor vehicle 2 and a distance between a rear axle of the motor vehicle 2 and the trailer coupling 4. Moreover, inputs of the Kalman filter 20 are dynamic parameters 23, 24 of the motor vehicle 2 that describe the direction of travel of the motor vehicle 2. The direction of travel of the motor vehicle 2 in particular influences the attachment angle 14 between the motor vehicle 2 and the trailer 3. Said dynamic parameters of the motor vehicle 2 are in particular the wheel steering angle 23 of the front wheels of the motor vehicle 2 and the wheel steering angle 24 of the rear wheels of the motor vehicle 2. A further input of the Kalman filter 20 is a dynamic parameter of the trailer 3, which is in particular a measured attachment angle 14. The attachment angle 14 can for example be detected or measured by means of a sensor device in the trailer coupling 4 and/or by using images of a rear camera of the motor vehicle 2 facing downwards towards the trailer coupling 4.

Using the parameters 14, 17 of the trailer 3 determined in step S3, moreover, a region occupied by the trailer 3 in the surrounding area 6 of the motor vehicle 2 can be determined. In a fourth step S4, using the region occupied by the trailer 3 in the surrounding area 6, measurement points in sensor data that have been acquired by the sensor device 11 of the motor vehicle 2 and which relate to the trailer 3 can be filtered out. It can thus be prevented that the driver of the vehicle-trailer combination 1 is warned about the trailer 3, which is actually not an obstacle for the motor vehicle 2. In a fifth step 35 of the method, objects in the surrounding area 6 that have been detected based on the sensor data of the sensor device 11 of the motor vehicle 2, and in common with the radar sensor data of the radar sensor 7, are placed in a common environment map. For this purpose, the first environment map and the second environment map are merged or combined to form the common environment map.

Figure 5:
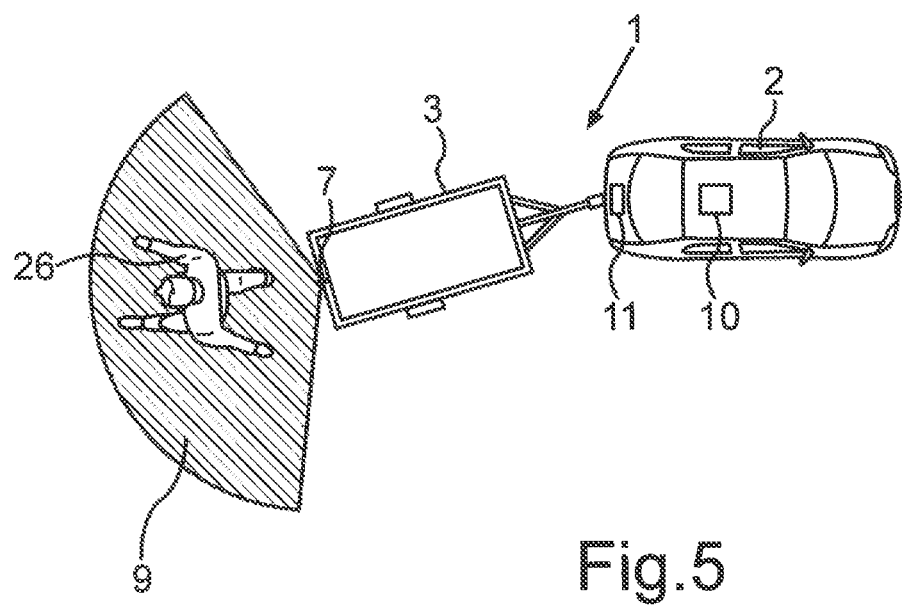
FIG. 5 shows a schematic representation of the vehicle-trailer combination with a pedestrian behind the trailer.

In a sixth step S6 of the method, a number of assistance functions can be provided for the driver of the vehicle-trailer combination 1 by means of a driver assistance system of the vehicle-trailer combination 1 based on the merged environment map, which are shown by way of example in FIG. 5 to FIG. 8. In FIG. 5, for example, it is shown that there is a pedestrian 26 behind the trailer 3. Because the view of the driver of the motor vehicle 2 is limited because of the trailer 3 disposed in the field of view of the driver, it can occur that the driver does not see the pedestrian 26. If the driver of the vehicle-trailer combination 1 were now to move in the rearward direction, then the trailer 3 would collide with the pedestrian 26. In order to avoid this, the pedestrian 26 in the detection region 9 of the radar sensor 7 of the trailer 3 is detected using the radar sensor data of the radar sensor 7. There are thus measurement points in the radar sensor data of the radar sensor 7 that correspond to the pedestrian 26. Said measurement points can for example be extracted by the controller 10 of the motor vehicle 2 from the transmitted radar sensor data. Thus, the controller 10 can detect that the pedestrian 26 is behind the trailer 3. A warning signal can now be output to the driver of the motor vehicle 2, with which the driver of the motor vehicle 2 can be advised that the pedestrian 26 is behind the trailer 3. As a result, the pedestrian 26 can be prevented from being injured by the vehicle-trailer combination 1.

Figure 6:
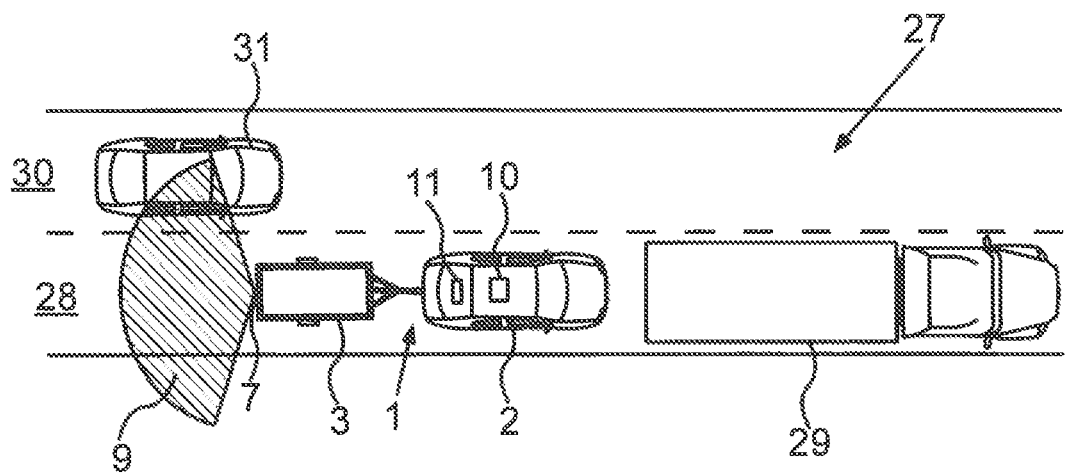
FIG. 6 shows a schematic representation of the vehicle-trailer combination during an overtaking manoeuvre.

In FIG. 6, the vehicle-trailer combination 1 is shown when travelling on a two-lane road 27. The vehicle-trailer combination 1 is travelling here on a right lane 28 and is following another vehicle, which is embodied here as a truck 29. On a left lane 30 of the two-lane road 27, a further vehicle 31 is approaching the vehicle-trailer combination 1 from behind. Because the vehicle-trailer combination 1 is longer than the motor vehicle 2 because of the trailer 3, the trailer 3 would collide with the vehicle 31 if the driver of the vehicle-trailer combination 1 were to swing out with the motor vehicle 2, for example to overtake the truck 29. But because the vehicle 31 is within the detection region 9 of the radar sensor 7, the vehicle 31 and the position thereof relative to the vehicle-trailer combination 1 can be detected and a relative speed between the vehicle 31 and the vehicle-trailer combination 1 can be determined. The driver of the vehicle-trailer combination 1 can be warned about the vehicle 31 based thereon and for example can be notified that swinging out or an overtaking manoeuvre is not possible at the moment.

Figure 7:
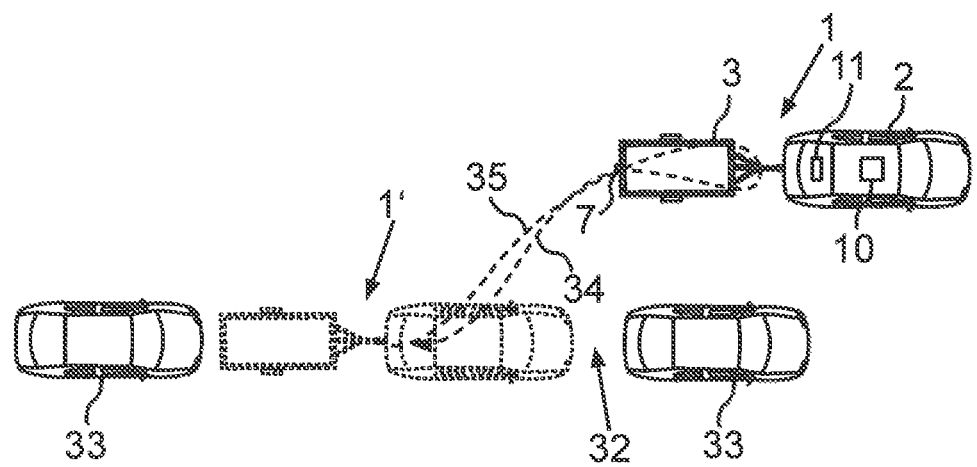
FIG. 7 shows a schematic representation of the vehicle-trailer combination during reverse parking into a parking space.

In FIG. 7, the vehicle-trailer combination 1 is shown while reverse parking into a parking space 32 bounded by two other vehicles 33. Using the radar sensor 7, the parking space 32 can for example be measured while the vehicle-trailer combination 1 is passing the parking space 32. If the length of the parking space 32 is sufficient, the driver can be assisted while parking the vehicle-trailer combination 1 in the parking space 32. For this purpose, a first trajectory of travel 34 for the trailer 3 can be determined, and using the first trajectory of travel 34 of the trailer 3, a second trajectory of travel 35 for the motor vehicle 2 can be determined. The vehicle-trailer combination 1 can for example be manoeuvred fully autonomously into the parking space 32 along the trajectories of travel 34, 35. The trajectories of travel 34, 35 can also be shown to the driver of the vehicle-trailer combination 1 on a display device in the motor vehicle 2. For example, the driver of the motor vehicle 2 can move along the trajectory of travel 35 into the parking space 32, wherein the expected movement of the trailer 3 during parking can be shown to the driver by displaying the trajectory of travel 34 of the trailer 3. Thus, the vehicle-trailer combination 1 can be parked in the parking space 32 without any collisions. In the parking space 32, the vehicle-trailer combination 1 can be parked in a parking position.

Figure 8:
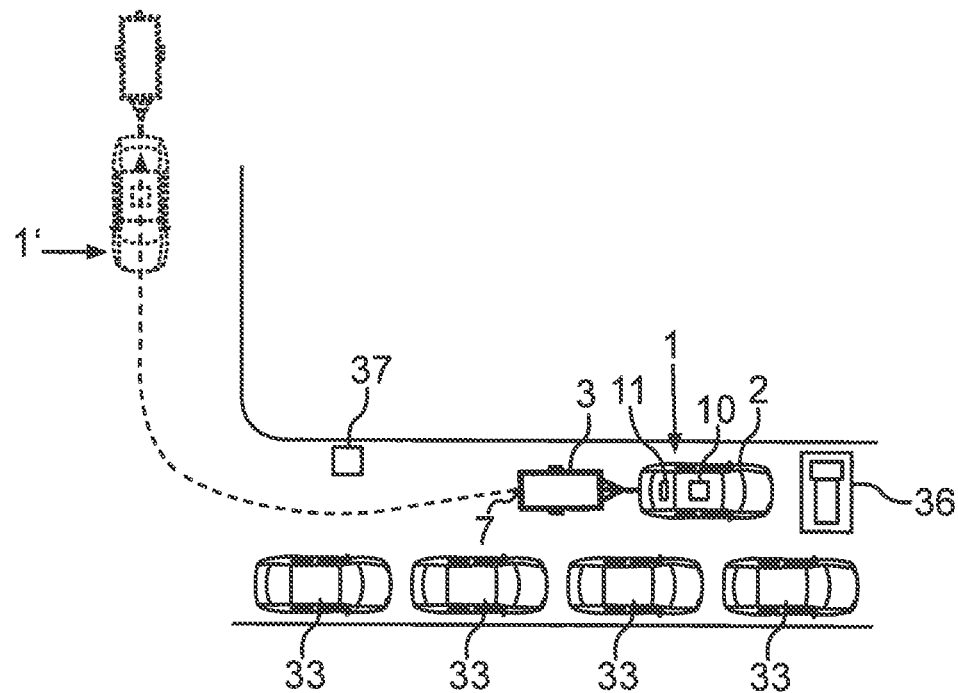
FIG. 8 shows a schematic representation of the vehicle-trailer combination when reversing out of a no-through-road.

In FIG. 8, the vehicle-trailer combination 1 that is in a no-through-road 36 is shown. In the no-through-road 36 there are a number of obstacles, for example in the form of parked vehicles 33 and a rubbish bin 37. In order to manoeuvre the vehicle-trailer combination 1 reliably backwards out of the no-through-road 36 without colliding with the obstacles 33, 37 while doing so, the surrounding area 6 behind the trailer 3 is detected by means of the radar sensor 7. Information about the obstacles 33, 37 behind the trailer 3 can be provided to the controller 10 of the motor vehicle 2. The sensor device 11 of the motor vehicle 2 can also detect obstacles 33, 37 that are in the field of view of the sensor device 11. The obstacles detected by the sensor device 11 of the motor vehicle 2 and the radar sensor 7 of the trailer 3 can be placed in a common environment map that describes the region in the no-through-road 36. Using the environment map, the vehicle-trailer combination 1 can be manoeuvred autonomously out of the no-through-road 36 and/or the driver can be advised of the obstacles 33, 37 while reversing out of the no-through-road 36.

The invention claimed is:

1. A method for monitoring a surrounding area of a vehicle-trailer combination formed by a motor passenger vehicle and a passenger vehicle trailer, comprising:
    disposing, subsequent to removing at least one radar sensor from a previously connected trailer, the at least one radar sensor on a mounting position of a rear area of the passenger vehicle trailer for acquiring radar sensor data from the surrounding area behind the passenger vehicle trailer, wherein the at least one radar sensor is a portable radar sensor;
    transmitting the acquired radar sensor data to a controller of the motor passenger vehicle; and
    calibrating, by the controller and based at least on the acquired radar sensor data, the at least one radar sensor to account for different mounting positions between the passenger vehicle trailer and the previously connected trailer.

2. The method according to claim 1, wherein radar sensor data are transmitted wirelessly to the controller of the motor passenger vehicle.

3. The method according to claim 1, wherein the at least one radar sensor is embodied as a portable radar sensor that is mounted on the rear area of the passenger vehicle trailer so as to be removable without damage.

4. The method according to claim 1 wherein the at least one radar sensor is automatically calibrated after mounting the at least one radar sensor on the passenger vehicle trailer.

5. The method according to claim 4, wherein for calibrating the at least one radar sensor,
    sensor data of at least one sensor device of the motor passenger vehicle and radar sensor data of the at least one radar sensor are received,
    a first environment map describing the surrounding area of the vehicle-trailer combination is determined based on the sensor data of the at least one sensor device of the motor passenger vehicle, a second environment map describing the surrounding area of the vehicle-trailer combination is determined based on the radar sensor data of the at least one radar sensor, and a tolerance range for a mounting position of the at least one radar sensor on the passenger vehicle trailer is determined using a comparison of the environment maps.

6. The method according to claim 4, wherein for determining an actual mounting position of the at least one radar sensor on the passenger vehicle trailer, at least one parameter of the passenger vehicle trailer is determined, wherein the at least one parameter of the passenger vehicle trailer is determined depending on at least one predetermined stationary parameter of the motor passenger vehicle and/or at least one acquired dynamic parameter of the motor passenger vehicle and/or at least one acquired dynamic parameter of the passenger vehicle trailer.

7. The method according to claim 6, wherein an attachment angle of the passenger vehicle trailer and/or a distance between a trailer coupling on the motor passenger vehicle and an axle of the passenger vehicle trailer is determined as the at least one parameter of the passenger vehicle trailer.

8. The method according to claim 6, wherein a wheelbase of the motor passenger vehicle and/or a distance between a rear axle and a trailer coupling of the motor passenger vehicle is specified as the at least one stationary parameter of the motor passenger vehicle, a wheel steering angle of front wheels and/or a wheel steering angle of rear wheels of the motor passenger vehicle is detected as the at least one dynamic parameter of the motor passenger vehicle and an attachment angle of the passenger vehicle trailer is detected as the at least one dynamic parameter of the passenger vehicle trailer.

9. The method according to claim 6, wherein the at least one parameter of the passenger vehicle trailer is determined depending on the at least one predetermined stationary parameter of the motor passenger vehicle and/or the at least one acquired dynamic parameter of the motor passenger vehicle and/or the at least one acquired dynamic parameter of the passenger vehicle trailer by Kalman filter.

10. The method according to claim 6, wherein using the at least one parameter of the passenger vehicle trailer, a region occupied by the passenger vehicle trailer in the surrounding area is detected, wherein using the region occupied by the passenger vehicle trailer, measurement points in sensor data of a sensor device in the motor passenger vehicle are classified as relating to the passenger vehicle trailer or to the surrounding area.

11. The method according to claim 1, wherein a first environment map describing the surrounding area is determined based on sensor data of at least one sensor device of the motor passenger vehicle, a second environment map describing the surrounding area is determined based on the radar sensor data of the at least one radar sensor, and the first and the second environment maps are merged to form a common environment map.

12. A monitoring device for a passenger vehicle trailer of a vehicle-trailer combination formed by a motor passenger vehicle and the passenger vehicle trailer, the monitoring device being configured to monitor a surrounding area of the vehicle-trailer combination, and which comprises;

at least one radar sensor mounted on a rear area of the passenger vehicle trailer for acquiring radar sensor data from the surrounding area behind the passenger vehicle trailer, wherein the at least one radar sensor is a portable radar sensor that is disposed on a mounting position of the rear area of the passenger vehicle trailer subsequent to being removed from a previously connected trailer, wherein the at least one radar sensor transmits the acquired radar sensor data to a controller of the motor passenger vehicle, and wherein the at least one radar sensor is calibrated by the controller of the motor passenger vehicle based at least on the acquired radar sensor data to account for different mounting positions between the passenger vehicle trailer and the previously connected trailer.

13. A driver assistance system for a vehicle-trailer combination comprising:

a monitoring device for a passenger vehicle trailer of the vehicle-trailer combination formed by a motor passenger vehicle and the passenger vehicle trailer, the monitoring device being configured to monitor a surrounding area of the vehicle-trailer combination, and which comprises;

at least one radar sensor mounted on a rear area of the passenger vehicle trailer for acquiring radar sensor data from the surrounding area behind the passenger vehicle trailer, wherein the at least one radar sensor is a portable radar sensor that is disposed on a mounting position of the rear area of the passenger vehicle trailer subsequent to being removed from a previously connected trailer, wherein the at least one radar sensor transmits the acquired radar sensor data to a controller of the motor passenger vehicle, and wherein the at least one radar sensor is calibrated by the controller of the motor passenger vehicle based at least on the acquired radar sensor data to account for different mounting positions between the passenger vehicle trailer and the previously connected trailer; and the controller for receiving the acquired radar sensor data.

14. The vehicle-trailer combination comprising the motor passenger vehicle, the passenger vehicle trailer and the driver assistance system according to claim 13, wherein the at least one radar sensor of the monitoring device is mounted on the passenger vehicle trailer.

* * * * *